Oct. 17, 1950     Y. K. ARASE     2,526,317
LAWN TRIMMER
Filed Nov. 27, 1946
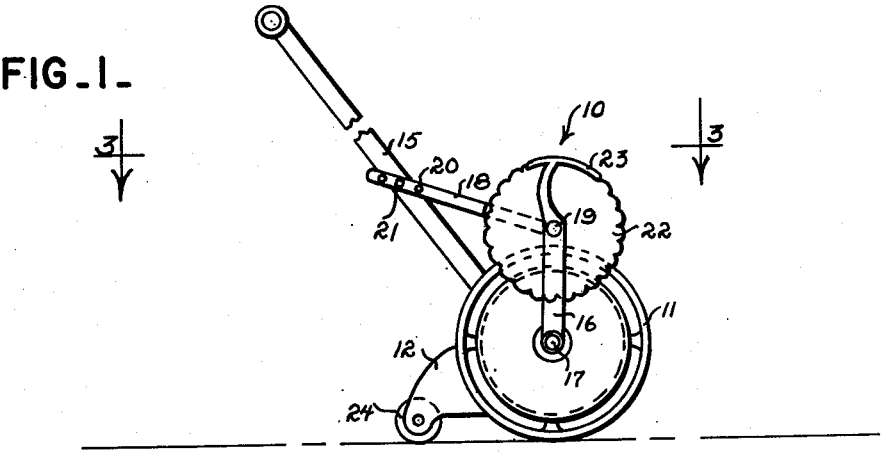
FIG.1.
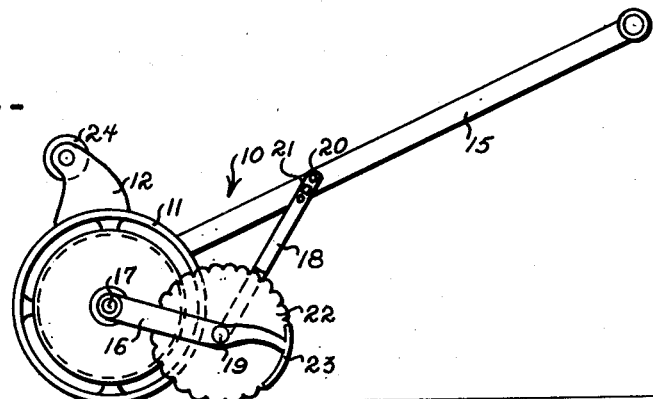
FIG.2.
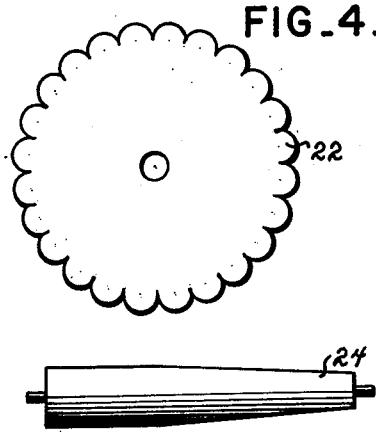
FIG.4.
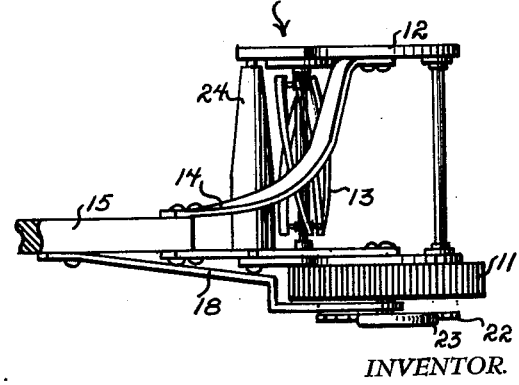
FIG.3.
FIG.5.
INVENTOR.
YURIKO K. ARASE
BY *Victor J. Evans & Co.*
ATTORNEYS Patented Oct. 17, 1950

2,526,317

UNITED STATES PATENT OFFICE 2,526,317

LAWN TRIMMER

Yuriko K. Arase, Minneapolis, Minn.

Application November 27, 1946, Serial No. 712,617

1 Claim. (Cl. 56—251)

This invention relates to a toothed trimmer and roller for a lawn mower.

An object of the invention is to provide a trimmer that will efficiently trim the lawn at the extreme edge thereof while the lawn mower is in inoperative position, and is in inoperative position when the lawn mower is in operative position.

With the above and other objects in view, the invention consists of the novel details of construction, arrangement and combination of parts more fully hereinafter described, claimed and illustrated in the accompanying drawing in which:

Figure 1 is a side elevational view of an embodiment of the invention in use with a lawn mower with the embodiment in inoperative position, and the mower in cutting position;

Figure 2 is the same with the embodiment of the invention in operative position and the lawn mower in inoperative position;

Figure 3 is a plan view on the line 3—3 of Figure 1;

Figure 4 is an elevational view of the cutter and

Figure 5 is an elevational view of the roller.

Referring more in detail to the drawing, the reference numeral 10 designates a lawn mower having the ground wheel 11 mounted on the frame 12 between which is journalled the cutting reel 13, and the yoke 14 of the handle 15 is secured to the frame 12 in the conventional manner.

The invention contemplates the use of an arm 16 which is mounted on the axle 17 of the wheel 11, and which extends vertically from the axle 17 to be connected to a second arm 18 by means of an axle or pivot pin 19. The arm 18, at its opposite end, is provided with spaced openings 20 whereby it may be adjustably secured to the handle 15 by the bolt 21.

The axle or pivot pin 19 has a toothed circular trimming blade 22 mounted therein, which is in cutting position when the mower is in operative position, as shown in Figure 2, to cut the extreme edge of the lawn.

The arm 16 extends beyond the pin or axle 19 to a point equal to the diameter of the trimmer 22, and an arcuate shaped guard 23 is secured to the end thereof to conform to the shape of the trimmer. The guard 23 will prevent the rear edge of the trimmer from sliding obstructions if in trimming the edge the mower is pulled backward as is found necessary in retrimming the edge, should stones or part of the concrete walk extend into the edge of the lawn the guard will prevent the same from striking the trimmer, in the position shown in Figure 1 it will also protect the edge of the trimmer to prevent the striking thereof and may prevent cutting the operator should he handle his mower carelessly.

To permit the mower to more effectively cut the lawn, it is provided with the tapered roller 24 shown in Figure 5. It permits the mower to travel at two levels, at the smallest end of the roller for a short cut or at the largest end of the roller for a long cut depending upon the lawn being cut. It will change the angle of the reel to permit a short cut at the edge of the lawn after the trimmer has cut the edge, or before the trimmer has cut the edge, and by rolling the mower on the largest part of the roller it will cut the regular way on other parts of the lawn.

The degree of cut depending upon what end of the roller engages the ground, with the large part of the roller engaging the ground a regular cut is made with the smaller part of the roller engaging the ground and the mower at an angle a short cut is made, the smaller part of the roller being very effective at the edge of the lawn.

There has thus been provided, an effective lawn mower and edge trimmer, the operation and construction of which will be apparent from the foregoing description, and it is to be understood that changes in the minor details of construction, arrangement and combination of parts may be resorted to, provided they fall within the spirit of the invention, and the scope of the appended claim.

Having thus described the invention, what is claimed as new and desired to be secured by Letters Patent is:

In a lawn mower having a frame, a tapered roller journalled in the frame, an axle journalled in the frame and a reel on the axle, a shaft and a ground wheel on the shaft, a handle fixed to the frame the improvement comprising an arm pivoted on the shaft, a second arm, means for pivoting one end of said second arm to said first arm, inwardly of the outer end thereof, means for adjustably connecting the other end of said second arm to said handle, a toothed disc trimmer mounted on the means for pivoting the second arm to the first arm, the end of the first arm outwardly of the last means being curved and a guard on the outer end of the first arm shaped to conform to the contour of the trimmer.

YURIKO K. ARASE.

REFERENCES CITED

The following references are of record in the file of this patent:

UNITED STATES PATENTS

| Number | Name | Date |
|---|---|---|
| 1,065,946 | Janson | July 1, 1913 |
| 1,720,169 | Cripe | July 9, 1929 |
| 1,844,190 | Stultz | Feb. 9, 1932 |
| 2,158,580 | Houser | May 16, 1939 |